Figure 1:
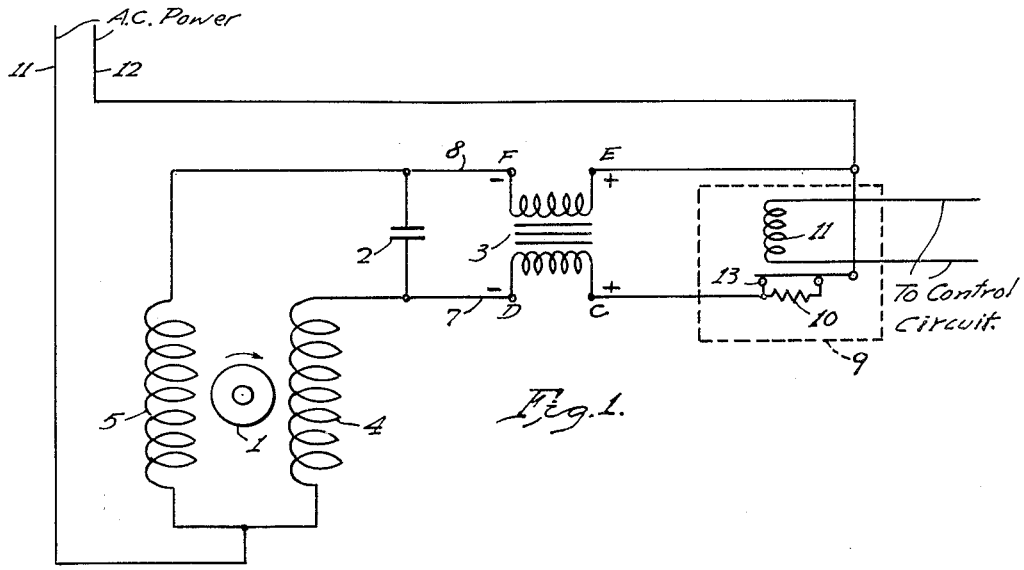

Sept. 6, 1955  Q. G. HOLTZ  2,717,347
CIRCUITS FOR SUPPRESSING ARCING IN THE CONTROL
OF CONDENSER-TYPE ELECTRIC MOTORS
Filed Oct. 30, 1953

INVENTOR.
Quentin G. Holtz.
BY
Howard Cooke
ATTORNEY:-

United States Patent Office 2,717,347
Patented Sept. 6, 1955

2,717,347

CIRCUITS FOR SUPPRESSING ARCING IN THE CONTROL OF CONDENSER-TYPE ELECTRIC MOTORS

Quentin G. Holtz, Pittsburgh, Pa., assignor to Gulf Research & Development Company, Pittsburgh, Pa., a corporation of Delaware Application October 30, 1953, Serial No. 389,233

4 Claims. (Cl. 318—207)

This invention concerns suppressor circuits for motor-control relays, and in particular concerns an arc suppressor for relays which control condenser-type electric motors, either unidirectional or reversible.

In a large number of electric-motor applications it is desired to start, stop and reverse an electric motor. When the motor is of the three-wire type with a condenser used for both starting and running, difficulties develop in that excessive arcing takes place at the switch contacts upon starting, stopping and reversing the motor. The difficulty is particularly aggravated in servo systems in which a delicate relay controls the operation of a reversible servomotor of the condenser type. In applications of this type the frequency of contact operation may be large and because of the small amount of relay power usually available, any arcing which results in pitting or sticking of the contacts cannot be tolerated because of the resulting unreliable operation of the servomotor.

In this invention a transformer is used and connected in the motor-relay contact circuit in such a manner that the surge voltage which arises from switching of the condenser in series with one winding of the motor is counterbalanced, thereby cancelling any tendency to arc at the relay contacts.

Accordingly, it is an object of this invention to provide an arc suppressor circuit for condenser-type motor-control relays which eliminates arcing at the relay contacts.

It is another object of this invention to provide an arc suppressor circuit for condenser-type motor-control relays which is reliable and inexpensive to manufacture.

Another object of this invention is to provide an arc suppressor circuit for reversible-motor control relays which eliminates contact trouble in sensitive servomotor control relays.

Figure 2:
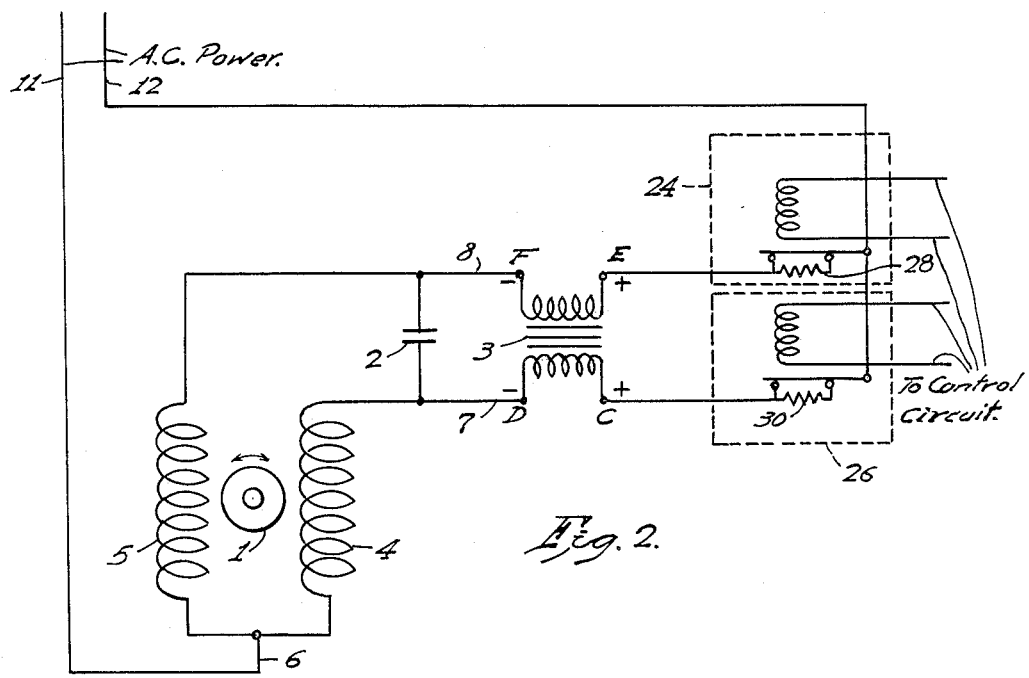

These and other objects of my invention are attained as explained in this specification of which the drawing forms a part, and in which:

Figure 1 is a schematic wiring diagram of one form of my invention employing a single relay to control unidirectional operation of a motor; and Figure 2 is a schematic wiring diagram of another form of my invention employing two relays for directional control of a motor.

In the figures like numerals refer to similar elements. Numeral 1 represents the rotor of a motor, for example a servomotor, having two windings 4 and 5, so arranged on the stator that when one winding is connected to A. C. power lines 11 and 12 and the other is connected to the same power lines through a condenser 2 of appropriate size, the motor runs in one direction, and when the condenser 2 is transferred from one winding to the other the direction of motor rotation is reversed. Thus the wires 6, 7 and 8 (Fig. 2) are the three leads to which A. C. power may be supplied to the motor, lead 6 being used for both directions of rotation, together with lead 7 for one direction of rotation, and with lead 8 for the other direction. Whenever one side 11 of the A. C. power is connected to lead 6 and the other side 12 is connected to leads 7 and 8 in parallel, the rotor is locked and remains stationary.

It is customary to control rotation of a motor of the type shown in the figures by means of one or more relays whose armature may make contact with leads 7 or 8 in response to relay-coil current and thereby control the motor. However, due to the presence of the condenser 2 in the circuit, considerable arcing tends to occur at the relay contacts. This arcing cannot be suppressed by the usual condenser-resistance type of arc suppressor, and the primary object of my invention is to substantially eliminate this arcing in the control of a condenser-type motor.

Referring to Figure 1, a sensitive relay 9 may be employed to control the motor 1. The relay coil 11 is connected to the control circuit which forms no part of this invention. The relay contacts are normally closed to supply A. C. power from lead 12 to motor leads 7 and 8, the other A. C. power line 11 being connected to motor lead 6. As power is thus normally supplied to both windings 4 and 5, the condenser 2 is effectively short circuited. This locks the motor armature and it does not rotate.

In the circuit of my invention, a transformer 3 is inserted as shown in the figures, with one winding (CD) in series with the lead 7 and the other winding (EF) in series with the lead 8. The windings are respectively connected as indicated so that a positive voltage applied at terminal C of winding CD will give rise to a positive voltage at terminal E of winding EF. The transformer 3 has a 1:1 voltage ratio and may be of the closed-core type with an impedance which is low compared to the impedance of the motor windings so that the transformer causes little voltage drop during running of the motor. However, the above connection of the transformer windings is such that when the relay contacts 13 are opened, the condenser is then in series with winding 4 and the motor will run. The voltage induced in winding CD by decay of current in lead 7 (which normally causes arcing at contact 13) will be counter-balanced by an induced voltage in CD which voltage is induced through the transformer by the rise of current in lead 8. The resistor 10 tends to equalize the rates of decay and rise respectively and improves the balance. Since the voltages induced when the relay shifts the circuit so as to include the condenser in the circuit are thus counterbalanced, there is no tendency to arc at the relay contacts. My invention in this manner effectively eliminates contact sticking or deterioration, and permits contact-trouble-free operation of a sensitive relay 9 for control of a capacity start and run motor.

Figure 2 shows the arc suppressor circuit of my invention applied to a relay system using two normally-closed relays 24 and 26 either of whose coils may be energized, or both may be deenergized. If both relay coils are deenergized, the motor is locked at rest. If one relay (24) is energized the motor is caused to run in one direction, and if the other relay (26) is energized the motor is caused to run in the opposite direction. The transformer 3 is connected in circuit with its winding CD in series with lead 7 and its winding EF in series with lead 8. The windings are connected so that a positive voltage applied at terminal C of winding CD will give rise to a positive voltage at terminal E of winding EF. When the relay 24 is energized and pulls up its armature the current in lead 8 will decay and this gives rise to a potential. However, at the same instant, the current in lead 7 will increase and the voltage induced in winding EF by the rise of current in CD will counterbalance the voltage induced by the decay of current in lead 8 whereby arcing at the contacts of relay 24 is eliminated. The resistors 28 and 30 are of relatively high value, and are connected across the relay contacts to equalize the rates of current change in the two leads 7 and 8 and thereby provide better balancing of the opposing voltages. Accordingly, any voltage tending to arc across the relay contacts is counterbalanced whereby arcing is eliminated.

By the term "three-wire condenser-type motor" as used in the appended claims is meant an alternating-current electric motor having three leads (as 6, 7 and 8 of Fig. 2), one of which is connected to one side of the source of power and is common to the motor windings, and the other two of which have a condenser connected between them and may be selectively connected to the other side of the source of power for a selected direction of motor rotation. The term switch includes manually or automatically operated switches, relays, selectors, and the like.

What I claim as my invention is:

1. In a three-wire condenser-type motor circuit comprising two motor windings and a condenser all connected in a closed series circuit with a first lead wire connected to the junction of the two motor windings, a second lead wire connected to a junction of the condenser and a motor winding, and a third lead wire connected to the other junction of the condenser and a motor winding, and in which operating power is supplied to said first and second wires to effect motor rotation in one direction, or to said first and third wires to effect motor rotation in the other direction, or to said first wire and both said second and third wires to lock the motor, the improvement which comprises a transformer having windings which are respectively connected in series with the second and third wires leading to a junction of the condenser and a motor winding and with the transformer windings connected so that a voltage of one sign applied to the terminal of one transformer winding nearest a junction gives rise to a voltage of the same sign at the terminal of the other transformer winding nearest a junction.

2. In a three-wire condenser-type motor circuit comprising two motor windings and a condenser all connected in a closed series circuit with a first lead wire connected to the junction of the two motor windings, a second lead wire connected to a junction of the condenser and a motor winding, and a third lead wire connected to the other junction of the condenser and a motor winding, and in which operating power is supplied to said first and second wires to effect motor rotation in one direction, or to said first and third wipers to effect motor rotation in the other direction, or to said first wire and both said second and third wires to lock the motor, the improvement which comprises a one-to-one turn ratio transformer having windings which are respectively connected in series with the second and third wires leading to a junction of the condenser and a motor winding and with the transformer windings connected so that a voltage of one sign applied to the terminal of one transformer winding nearest a junction gives rise to a voltage of the same sign at the terminal of the other transformer winding nearest a junction.

3. In a control circuit for a three-wire condenser-type motor comprising two motor windings and a condenser all connected in a closed series circuit with a first lead wire connected to the junction of the two motor windings, a second lead wire connected to a junction of the condenser and a motor winding, and a third lead wire connected to the other junction of the condenser and a motor winding, and in which operating power is supplied to said first and second wires to effect motor rotation in one direction, or to said first and third wires to effect motor rotation in the other direction, or to said first wire and both said second and third wires to lock the motor, and a switch in at least one of said second and third wires, the improvement which comprises a one-to-one turn ratio transformer having windings which are respectively connected in series with the second and third wires and with the transformer windings connected so that a voltage of one sign applied to the terminal of one transformer winding nearest the condenser gives rise to a voltage of the same sign at the terminal of the other transformer winding nearest the condenser, and a resistor connected across the switch.

4. In a control circuit for a three-wire condenser-type motor comprising two motor windings and a condenser all connected in a closed series circuit with a first lead wire connected to the junction of the two motor windings, a second lead wire connected to a junction of the condenser and a motor winding, and a third lead wire connected to the other junction of the condenser and a motor winding, and in which operating power is supplied to said first and second wires to effect motor rotation in one direction, or to said first and third wires to effect motor rotation in the other direction, or to said first wire and both said second and third wires to lock the motor, and normally-closed switches in said second and third wires, the improvement which comprises a one-to-one turn ratio transformer having windings which are respectively connected in series with the second and third wires and with the transformer windings connected so that a voltage of one sign applied to the terminal of one transformer winding nearest the condenser gives rise to a voltage of the same sign at the terminal of the other transformer winding nearest the condenser.

No references cited.